United States Patent [19]

Levine

[11] Patent Number: 5,647,938
[45] Date of Patent: Jul. 15, 1997

[54] PHOTO POSTCARD APPARATUS AND METHOD

[76] Inventor: Aaron Levine, 27837 Thackaray Ave., Hayward, Calif. 94544-5617

[21] Appl. No.: 522,537

[22] Filed: Sep. 1, 1995

Related U.S. Application Data

[63] Continuation of Ser. No. 179,340, Jan. 10, 1994, abandoned.
[51] Int. Cl.$^6$ .......................... B32B 31/18; B32B 31/08; B32B 35/00
[52] U.S. Cl. .......................... 156/269; 156/64; 156/249; 156/277; 156/324; 156/361; 156/387; 156/510; 156/516; 156/555; 229/92.8
[58] Field of Search .......................... 156/249, 269, 156/277, 329, 361, 387, 510, 516, 554, 555, 64; 229/92.8; 355/40, 77, 133

[56] References Cited

U.S. PATENT DOCUMENTS

| | | |
|---|---|---|
| 2,375,451 | 5/1945 | Waters . |
| 3,304,641 | 2/1967 | Gonczy . |
| 3,329,549 | 7/1967 | Vilutis . |
| 3,766,767 | 10/1973 | Rastelli . |
| 3,847,325 | 11/1974 | Nasalski et al. . |
| 3,864,708 | 2/1975 | Allen . |
| 3,875,861 | 4/1975 | Stackig . |
| 3,894,684 | 7/1975 | Florey . |
| 4,079,881 | 3/1978 | Sabb . |
| 4,201,613 | 5/1980 | Olivieri et al. .......................... 156/510 X |
| 4,237,633 | 12/1980 | Murrell . |
| 4,547,445 | 10/1985 | Asahina et al. . |
| 4,807,807 | 2/1989 | Glick . |
| 4,822,448 | 4/1989 | Thompson et al. . |
| 4,888,078 | 12/1989 | Instance .......................... 156/269 X |
| 4,911,477 | 3/1990 | Shishido . |
| 4,990,215 | 2/1991 | Anderson . |
| 5,045,139 | 9/1991 | Vonk . |
| 5,067,646 | 11/1991 | Young, Jr. et al. . |
| 5,094,708 | 3/1992 | Bechtel et al. . |
| 5,428,423 | 6/1995 | Clark .......................... 229/92.8 X |

FOREIGN PATENT DOCUMENTS

| | | |
|---|---|---|
| 2657047 | 7/1991 | France . |
| 63-34546 | 2/1988 | Japan . |
| 4-97245 | 3/1992 | Japan . |
| 4171446 | 6/1992 | Japan . |

*Primary Examiner*—Melvin Mayes
*Attorney, Agent, or Firm*—Douglas E. White; Acronational Law Firm

[57] ABSTRACT

An apparatus automatically places postcard backings on rolls of developed photo stock. The backings are formed from a roll of bulk label stock such as that sold under the trade name AVERY. The label stock comes with an adhesive layer on its back side, which adhesive is covered by a removable backing sheet. Preferably, indicia have previously been printed on the front side of the label at regular intervals thereon, the size of the intervals corresponding to the size to which the photo postcards will be cut. The two rolls are fed to traction rollers and past a manual calibration register. The backing then is peeled off of the label stock by an automatic peeling-blade which is inserted between the adhesive and the backing. After that, the two lines of feed are led to a laminating press, where they are pressed together and permanently mated by mutual contact with the adhesive layer. The next stage is a cutter which cuts the photo/label combination at the intersections of individual photos. The result is postcards, i.e. stiffened sheets each having a graphic side and a side pre-divided by printed indicia into text, address and stamp areas.

20 Claims, 2 Drawing Sheets

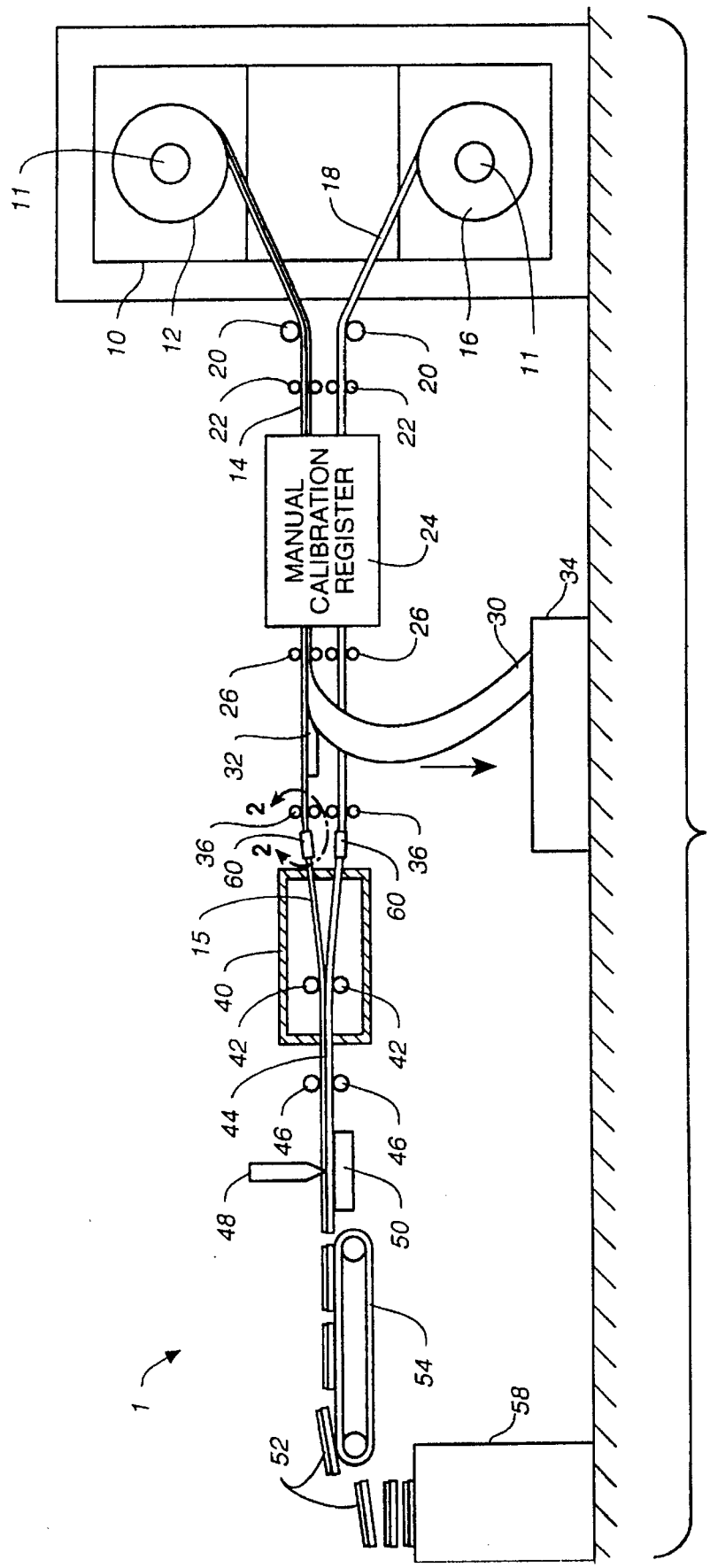
FIG._1

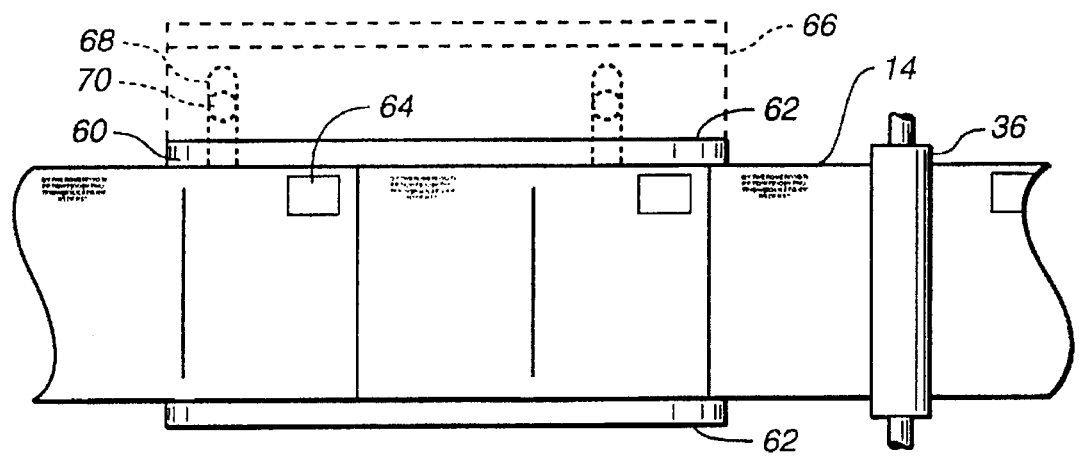
FIG._2
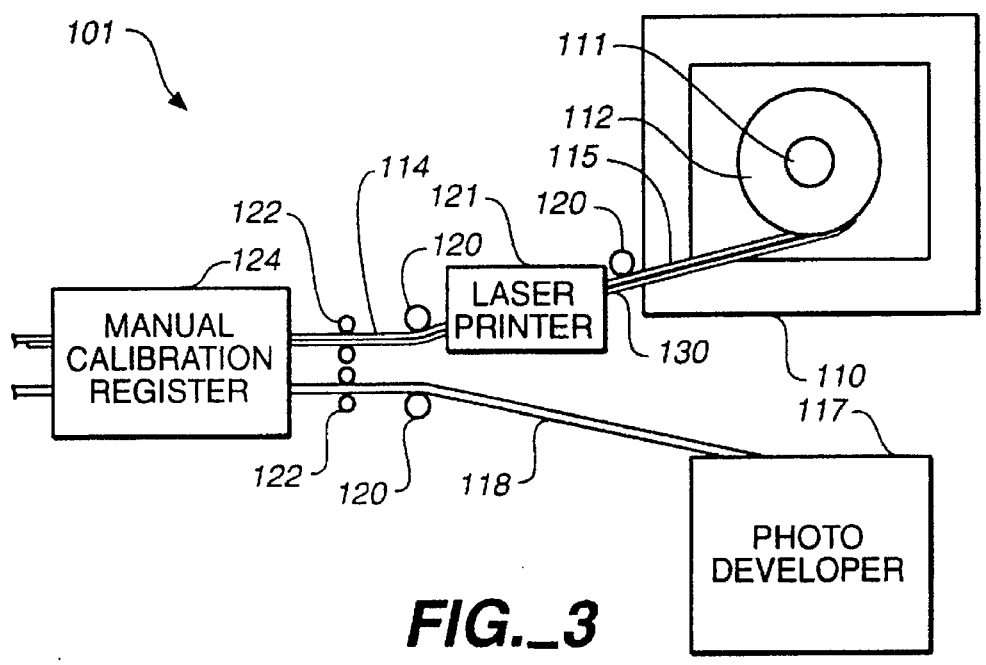
FIG._3

PHOTO POSTCARD APPARATUS AND METHOD

This application is a continuation of application Ser. No. 08/179,340 filed on Jan. 10, 1994, now abandoned.

FIELD OF THE INVENTION

This invention relates to an apparatus for the automated production of postcards by combining developed photo stock and adhesive-backed label stock.

BACKGROUND OF THE INVENTION

Postcards normally are produced by a printing process, i.e. the graphic subject is printed on one side of card stock (usually through a color-separation printing process) and areas for the text, the address and the postage stamp are printed on the other (usually in black). This process is suited to large-scale postcard production for the mass market, but does not well serve the needs of individuals and small businesses.

One is allowed to send "bare" photographs through the mail (i.e. ones addressed directly on their backs, without envelopes). However, photos do not come with indicia marking the text, address and stamp areas, nor are they stiff enough to resist substantial damage in transit.

Therefore, attempts have been made in the past to modify developed photo stock so as to be more suitable for mail transit in the form of postcards. The present invention is an apparatus and method which achieves this goal in a manner which automates small to medium-size production runs of photo-stock postcards.

Prior developments in this field may be generally illustrated by reference to the following information disclosure statement:

| Patent No. | Patentee | Issue Date |
|---|---|---|
| 3,864,708 | B. Allen | Feb. 04, 1975 |
| 3,875,861 | S. Stackig | Apr. 08, 1975 |
| 3,304,641 | D. Gonczy | Feb. 21, 1967 |
| 4,911,477 | S. Shishido | Mar. 27, 1990 |
| 4,237,633 | R. Murrell | Dec. 09, 1980 |
| 4,079,881 | A. Sabb | Mar. 21, 1978 |
| 3,894,684 | R. Florey | Jul. 15, 1975 |
| 4,547,445 | M. Asahina et al. | Oct. 15, 1985 |
| 3,847,325 | P. Nasalski et al. | Nov. 12, 1974 |

U.S. Pat. No. 3,864,708 teaches an apparatus that takes an instant photograph with a background of artificial scenery and dispenses it on a cardboard backing having postcard markings. Photo postcards are produced one at a time.

U.S. Pat. No. 3,875,861 teaches a process where multiple photographs are developed onto a roll of photographic stock, the non-image side of which is then printed with postcard markings and then cut into individual photo postcards. While the process is automated, no backing is provided. U.S. Pat. No. 4,547,445 teaches another approach that directly utilizes the back of a photograph.

U.S. Pat. Nos. 3,304,641, 4,911,477, 4,237,633, 4,079,881, 3,894,684 and 3,847,325 teach various forms of postcard backings designed to accept printed images or photographs. U.S. Pat. No. 3,304,641 teaches the use of a printed piece of cardboard having an adhesive layer that is covered with a peel-off sheet of protective material. This cardboard is used manually to produce photo postcards one at a time. The process of U.S. Pat. No. 4,911,477 automatically places a removable layer on top of the graphic (front) portion of a postcard, to temporarily conceal the graphic from view. This top layer is peeled off by the recipient of the postcard.

SUMMARY OF THE INVENTION

The present invention is an apparatus and method for automatically placing postcard backings on developed photo stock (which stock, prior to developing, is standard photo-sensitive paper). The photo stock is produced on a roll, comprising a long single strip of photo paper, by pre-existing and widely-available developing machinery. Such a roll of interconnected photos is manually transferred to the present apparatus, to which apparatus also has been added a roll of bulk single-strip label stock (such as that sold under the trade name AVERY). Alternatively, the apparatus can be modified by including the developing machinery directly within it, so that a transfer of the photo stock roll becomes unnecessary.

The label stock comes with an adhesive layer on its back side, which adhesive is covered by a removable (peel-off) backing sheet. Preferably, indicia previously printed on the front side of the label at regular intervals thereon, the size of the intervals corresponding to the size to which the photos are to be cut. However, the label indicia could be printed at a later stage of the process, or as an integral step within the photo/label assembly procedure described herein.

The two rolls are fed to powered traction rollers and past a manual calibration register. The protective backing then is peeled off of the label stock. After that, the two separate lines of feed are led to a laminating press, where they are pressed together and permanently mated into a single feed line by mutual contact with the adhesive layer. The next stage is a cutter which cuts the photo/label combination at the intersections of individual photos.

The result is "postcards", i.e. stiffened sheets each having a graphic side and a side pre-divided by printed indicia into text, address and stamp areas. Unlike present postcards, however, these assembly-line postcards have their graphic side produced by photographic developing.

After cutting, stations may be provided for stacking and/or collating the postcards and for shrink-wrapping groups thereof.

FEATURES AND ADVANTAGES

An object of this invention is to disclose photo postcard apparatus which includes a first spindle for mounting in first roll form a first long strip of label stock suitable for division into a large plurality of postcard pieces; for example, at least 12 pieces and easily well over 100 pieces. The label stock has a paper layer, an adhesive layer affixed to a first side of the paper layer, and a peel-off backing sheet temporarily affixed to and covering the adhesive layer. A second spindle is provided for mounting in second roll form a second long strip of developed photo stock suitable for division into the large plurality of postcard pieces. Further included are a backing peeler for removing the backing sheet; a laminating press for pressing the photo stock against the adhesive layer; and a cutter for separating the pressed-together strips of photo and label stocks into the plurality of postcard pieces.

Another object or feature is a plurality of sets of postcard indicia printed on a second side of the paper layer, each set of indicia being no longer than the length of a single postcard piece; and a plurality of photos developed on the photo stock, each photo being substantially the length of a single postcard piece.

Another feature is a manual calibration register for aligning each set of indicia with a photo.

In this invention, the size of the postcard pieces are determined by postal mailing regulations.

Still another feature is roller means for advancing the first and second strips toward the cutter. The roller advancing means is comprised of a plurality of free rollers and a plurality of dual-power rollers.

Yet another feature is a roll feed frame upon which the first and second spindles are mounted.

Another feature is a plurality of feed track segments for guiding the first and second strips as they advance.

Another feature is an apparatus which is easy to use, attractive in appearance and suitable for mass production at relatively low cost.

Other novel features which are characteristic of the invention, as to organization and method of operation, together with further objects and advantages thereof will be better understood from the following description considered in connection with the accompanying drawing in which a preferred embodiment of the invention is illustrated by way of example. It is to be expressly understood, however, that the drawing is for the purpose of illustration and description only and is not intended as a definition of the limits of the invention.

Certain terminology and derivations thereof may be used in the following description for convenience in reference only and will not be limiting. For example, words such as "upwardly," "downwardly," "leftwardly," and "rightwardly" would refer to directions in the drawings to which reference is made unless otherwise stated. Similarly, words such as "inwardly" and "outwardly" would refer to directions toward and away from, respectively, the geometric center of a device or area and designated parts thereof. References in the singular tense include the plural, and vice versa, unless otherwise noted.

BRIEF DESCRIPTION OF THE DRAWING

FIG. 1 is a schematic front elevation of the photo postcard apparatus of this invention;

FIG. 2 is a top view, in broken section, of a segment of the feed track of the apparatus, taken along line 2—2 of FIG. 1, a second position thereof being shown in phantom; and FIG. 3 is a schematic front elevation of a portion of a second embodiment of the invention.

Drawing Reference Numerals 1 photo postcard apparatus
10 roll feed frame
11 spindle of 10
12 roll of 14
14 label stock
15 label paper
16 roll of 18
18 photo stock
20 free roller
22 dual power rollers
24 manual calibration register
26 dual power rollers
30 backing sheet of 14
32 backing peeler
34 floor receptacle for 30
36 dual power tension rollers
40 laminating press
42 pressure roller of 40
44 combined feed
46 tension roller
48 cutter
50 bed for 48
52 photo postcard
54 conveyor belt
58 stacking station
60 feed track segment
62 lip of 60
64 postcard indicia on 14
66 bed of 60
68 slot in 66
70 screw
101 photo postcard apparatus
110 roll feed frame
111 spindle of 110
112 roll of 114
114 label stock
115 label paper
117 photo developer
118 photo stock
120 free roller
121 laser printer
122 dual power rollers
124 manual calibration register
130 backing sheet of 114

DESCRIPTION OF A PREFERRED EMBODIMENT

Referring to FIGS. 1 and 2, there is schematically illustrated therein a preferred photo postcard apparatus 1 of this invention. Apparatus 1 generally comprises a plurality of serially interconnected stations, namely, a roll feed frame 10; a manual calibration register 24; a backing peeler 32; a laminating press 40; a cutter 48; and a stacking station 58. The stations of the apparatus 1 are interconnected by suitable feed tracks, one portion of which is illustrated in FIG. 2 as feed track segment 60.

The apparatus and process for producing photo postcards may be described with reference to FIG. 1, proceeding from the right to the left thereof. A roll feed frame 10 has a pair of rotatable spindles 11 mounted thereupon. It is to be understood that while the stations of the apparatus 1 are all shown oriented vertically in the elevational view of FIG. 1, in practice some or all of them may be rotated 90 degrees, i.e. oriented horizontally. For example, the roll feed frame 10 might be oriented so as to have vertical spindles 11.

First, a roll 12 is placed on one of the spindles 11 of the feed frame 10. The roll 12 is comprised of a long strip of label stock 14. As used herein, a "long strip" refers to one whose length is many orders of magnitude greater than its width. The label stock 14 is comprised of a continuous sheet of paper material 15 onto the back side of which has been added a layer of adhesive. A peel-off backing sheet 30 covers the adhesive layer, to prevent adjacent paper layers of the roll 12 from sticking together. Label stock 14 is available commercially, e.g. under the trade name AVERY.

The label stock 14 preferably will have imprinted on its front side, in a separate prior procedure, a continuous plurality of sets of serially recurring postcard indicia 64 (see FIG. 2). Preferably, these sets of indicia will include all of the printed features found on a standard postcard, such as text describing the photograph; copyright and other vendor notices; a postage stamp placement marker; and a vertical line separating the text and the address areas. Registration indicia may also be included with which to aid the manual registration process discussed below.

Alternatively, such indicia 64 may be imprinted onto the label stock as an integral step of the present process—see the discussion of the embodiment of FIG. 3, below.

Next, a roll 16 comprising a single long strip of previously-developed photographic print stock 18 is transferred to the other spindle 11. The free ends of rolls 12, 16 are fed past free rollers 20 to dual-power traction rollers 22. Obviously, it does not matter which roll 12, 16 is placed first on the frame 10.

The next station is a manual calibration register 24, the operational features of which are understood in the art. Briefly, at station 24 optical apparatus allows a human operator to view the photo stock 18 as it proceeds past and to advance or retard its progress, so as to assure that individual photos are cut precisely at their margins when they reach the station of cutter 48. Unobtrusive registration indicia (not illustrated) may be included on the photo stock to assist in this process. Assuming that postcard indicia 64 have been imprinted on the label stock 14, the calibration register 24 also includes optical means for simultaneously viewing both the photo stock 18 and the label stock 14 as they pass through the register 24 so that the operator may match the edges of both for later cutting. Alternatively, automatic calibration equipment may be provided; see, for example, the automated apparatus that accomplishes a somewhat similar function in U.S. Pat. No. 3,875,861.

After calibration, the label stock and photo stock lines proceed together past dual-power rollers 26. Up to and past this point, the two lines of stock 14, 18 proceed parallel to each other, but are somewhat separated. Immediately after passing rollers 26, the label stock 14 reaches a knife-like backing peeler 32 that splits the backing sheet 30 off from the label stock 14 and exposes the inner adhesive layer. The backing sheet 30 is led away from the assembly line, preferably into a waste receptacle 34. From the backing peeler, the two parallel feed lines travel to dual-power rollers 36.

To provide support and control, suitable feed tracks are included in the apparatus 1 at various places along the line of travel of the two feed lines of stocks 14, 18. For clarity, these tracks generally have been eliminated from the schematic illustration of FIG. 1. However, one such feed track segment 60 is illustrated in FIG. 2, which segment is representative of the remainder of the feed tracks. This feed track 60 holds label stock 14 on a bed 66. The bed is defined between two parallel lips 62 that are perpendicular to the bed and are spaced apart with respect to each other a predetermined, but adjustable, distance. For any one batch, this distance is set to be substantially the same as the width of label stock 14 being processed. In the case of the lower track segments, the bed width will be substantially the same as the width of the photo stock 18. Some clearance between the edges of the stock 14 and the lips 62 is provided, however, to allow the stock to be guided without binding. In FIG. 2 also is seen the sets of postcard indicia 64 which previously have been printed on the front (top) side of the label stock 14. Although the adhesive layer on the back (bottom) side of the label stock is exposed at this point, only light and transient contact is made between it and the segment bed. However, should sticking to the bed be a problem, narrow raised portions can be provided on the bed to minimize the area of mutual contact. It is also possible to arrange the equipment so that it is the printed side of the label stock which contacts the track beds, and not the adhesive side.

Means for adjusting the width of the feed track is provided, in order that postcards of various sizes may be produced, for example, ones corresponding to standard cut-photo sizes such as approximately 3 inches by 5 inches, approximately 4 inches by 6 inches, and approximately 8 inches by 10 inches, or ones corresponding to other sizes which comply with U.S. postal service and international mailing-size regulations. Shown in phantom in FIG. 2 is a second position of the track segment 60, namely, one in which the distance between the retaining lips 62 has been increased to accommodate wider stock. One conventional way this may be accomplished is through the use of guide screws 70 affixed within slots 68. The slots pass through both parts of a two-part bed 66, the parts of which overlap. One lip 62 projects up from each bed part (not separately illustrated) so that the lips may be drawn apart or together when the screws 70 are loose. Of course, more sophisticated means are available in the art, such as pneumatically or electrically-controlled track-width adjustment equipment.

Next, the label 14 and photo 18 stocks enter a laminating press 40, where they are pressed firmly together by pressure rollers 42. Thereafter, the label stock 14 is held permanently in place against the photo stock 18 by means of the label adhesive. The calibration previously done upstream at the calibration register 24 assures that the sets of printed postcard indicia 64 are precisely aligned with the individual photos, in order that properly composed photo postcards 52 later may be produced.

The single-line combined photo/label feed strip 44 thus produced leaves the laminating press 40 and passes by tension rollers 46. A cutter blade 48 automatically reciprocates against and away from its bed 50, separating the combined feed 44 into photo postcards 52. The postcards may drop into a suitable bin or stacking station at this point. However, they might best be carried to a somewhat remote stacking station 58 by a conveyor belt 54, or by similar apparatus. After being stacked into thematically or numerically-selected sets, the stacks of postcards 52 may be transported to a shrink-wrapping station (not illustrated), or other packaging center, for distribution to customers.

The embodiment of photo postcard apparatus 1 discussed above assumes that a generic (relatively unvarying) form of postcard indicia set will be used, i.e. one which remains the same throughout a full roll of label stock. However, custom postcard indicia, such as text indicia describing the pictorial content of the photo on the obverse side of the card, may be produced with the photo postcard apparatus 101 shown in FIG. 3.

A roll feed frame 110 has a rotatable spindle 111 mounted thereupon. It is to be noted that, for convenience, the last two positions of the reference numerals of the alternate embodiment of the invention duplicate those of the numerals of the embodiment of FIG. 1, where reference is made to similar or corresponding parts. However, it should not be concluded merely from this numbering convention that similarly numbered parts are equivalents.

First, a roll 112 of label stock 114 is placed on the spindle 111. The long strip of label stock 114 is comprised of a continuous sheet of paper material 115 onto the back side of which has been added a layer of adhesive. A backing sheet 130 covers the adhesive layer.

A laser printer 121 is installed in-line in the apparatus. In other words, after passing a free roller 120, the label stock 114 is fed into the manual feed slot of the printer. After the printing operation described below, the strip of label stock feeds continuously out of the output slot of the printer 121. Obviously, the rate of feed of the postcard assembly operation as a whole will be timed, and stopped and started, in accordance with the requirements and limitations of the laser printer 121. Preferably the apparatus 101 will use one of the small "personal" laser printers available under the trademark LASERJET available from Hewlett Packard Corp., or will use another brand of personal laser printer. These printers are suitable for use herein with little or no modification except, perhaps, for the provision of linkage between the input and output slots of the printer and the feed track of the apparatus.

The printer 121 preferably imprints on the front side of label stock 114 a continuous set of serially recurring postcard indicia (not illustrated; but see FIG. 2). Preferably, these indicia will include all of the printed features found on a standard postcard, such as a postage stamp placement marker and a vertical line separating the text and address areas. Use of the laser printer 121 also will allow the printing of custom (variable) text describing the photographs and custom copyright and vendor notices. Registration indicia also may be included with which to aid the manual registration process (discussed above in connection with the apparatus of FIGS. 1 and 2).

The laser printer 121 will be directed by a suitable personal computer (not illustrated). Simple word-processing software will allow the on-site composition of custom text. This will permit, for example, multiple batches of photographs residing on a single long strip of developed photo stock to receive differing text and graphic indicia without any need to stop the process to reload label stock.

A roll of developed photo stock might be placed on a second spindle, as in the previous embodiment. Alternatively, however, as in the present embodiment, a dedicated photo developer apparatus 117 is directly incorporated into the photo postcard apparatus 101, thus eliminating the need for a manual photo-roll transfer step.

Immediately as it exits the photo developer 117, the free end of the long strip of developed photo stock 118 is fed past a free roller 120 to dual-power rollers 122, where it passes directly below the label stock 114 that has just been imprinted by the laser printer 121. The label stock 114 passes between a second set of dual-power rollers 122 at about the same point.

The next station is a manual calibration register 124, the operational features of which are known and are briefly discussed above in connection with the embodiment of FIG. 1. The remainder of the photo postcard apparatus 101 is constructed exactly like that of apparatus 1, and illustration thereof is therefore omitted.

While the above provides a full and complete disclosure of the preferred embodiments of this invention, various modifications, alternate constructions, and equivalents may be employed without departing from the true spirit and scope of the invention. Such changes might involve alternate materials, components, structural arrangements, sizes, operational features or the like. As just one example, a dot matrix printer could be substituted for the laser printer of apparatus 101. Therefore, the above description and illustrations should not be construed as limiting the scope of the invention which is defined by the appended claims.

What is claimed is:

1. A method of producing photo postcard pieces including the steps of:
   providing a long strip of label stock capable of division into a large plurality of postcard pieces of equal length, the label stock having
   a paper layer,
   a single adhesive layer affixed to one side of the paper layer, said single adhesive layer becoming the sole adhesive layer of each postcard piece, and
   a peel-off backing sheet temporarily affixed to and covering the single adhesive layer;
   providing a long strip of undeveloped photo stock capable of division into the large plurality of postcard pieces of equal length;
   providing a backing peeler for removing the backing sheet;
   providing a laminating press for pressing the photo stock against the single adhesive layer;
   providing a cutter for separating the pressed together photo and label stocks into the plurality of postcard pieces of equal length, the cutter having a cutter bed;
   printing a plurality of sets of postcard indicia on the other side of the paper layer, each set of indicia being substantially the length of a single postcard piece;
   developing a plurality of photos on the photo stock, each photo being the length of a single postcard piece;
   providing a manual calibration register for aligning each set of indicia with a photo and for aligning the photos with the cutter;
   providing a plurality of free rollers for guiding the strips;
   providing a plurality of dual-power rollers for advancing the strips toward the cutter;
   advancing the strips past the calibration register;
   using the calibration register to manually align each set of indicia with a photo;
   advancing the strip of label stock to the backing peeler;
   using the backing peeler to peel off the backing;
   advancing the strips to the laminating press;
   using the laminating press to press the strips together;
   advancing the strips thus pressed together to the cutter; and
   cutting the pressed-together strips into the plurality of postcard pieces.

2. Photo postcard apparatus including:
   a first long strip of label stock suitable for division into a large plurality of postcard pieces of equal length, the label stock having
   a paper layer,
   a single adhesive layer affixed to one side of the paper layer, said single adhesive layer becoming the sole adhesive layer of each postcard piece, and
   a peel-off backing sheet affixed to and covering the single adhesive layer;
   a second long strip of developed photo stock suitable for division into the large plurality of postcard pieces of equal length;
   a backing peeler for removing the backing sheet;
   a laminating press for pressing the photo stock against the single adhesive layer; and
   a cutter for separating the pressed-together photo and label stocks into the plurality of postcard pieces of equal length.

3. The apparatus of claim 2 further including:
   a plurality of sets of postcard indicia printed on the other side of the paper layer, each set of indicia being no longer than the length of a single postcard piece; and
   a plurality of photos developed on the photo stock, each photo being substantially the length of a single postcard piece.

4. The apparatus of claim 3 further including:
   a manual calibration register for aligning each set of indicia with a photo.

5. The apparatus of claim 4 wherein:

the size of the postcard pieces are determined by postal mailing regulations.

6. The apparatus of claim 2 further including:

roller means for advancing the strips toward the cutter.

7. The apparatus of claim 6 wherein:

the roller means is comprised of
   at least one free roller, and
   at least one set of dual-power rollers.

8. The apparatus of claim 7 further including:

a printer for printing a plurality of sets of postcard indicia on the other side of the paper layer, each set of indicia being the length of a single postcard piece, the printer having
   an input slot and
   an output slot,
the first strip of label stock entering the input slot and exiting the output slot.

9. The apparatus of claim 8 further including:

a frame having a spindle for mounting the first strip in roll form.

10. The apparatus of claim 9 further including:

a plurality of feed track segments for guiding the strips as they advance.

11. The apparatus of claim 10 further including:

a receptacle for receiving the backing sheet after removal.

12. Photo postcard apparatus including:

a first spindle on which is mounted in first roll form a first long strip of label stock suitable for division into a large plurality of postcard pieces, the label stock having
   a paper layer,
   a single adhesive layer affixed to a first side of the paper layer, said single adhesive layer becoming the sole adhesive layer of each postcard piece, and
   a peel-off backing sheet temporarily affixed to and covering the single adhesive layer;
a second spindle on which is mounted in second roll form a second long strip of developed photo stock suitable for division into the large plurality of postcard pieces;
a backing peeler for removing the backing sheet;
a laminating press for pressing the photo stock against the single adhesive layer; and
a cutter for separating the pressed-together strips of photo and label stocks into the plurality of postcard pieces.

13. The apparatus of claim 12 further including:

a plurality of sets of postcard indicia printed on a second side of the paper layer, each set of indicia being no longer than the length of a single postcard piece; and
a plurality of photos developed on the photo stock, each photo being substantially the length of a single postcard piece.

14. Photo postcard apparatus including:

a first spindle for mounting in first roll form a first long strip of label stock suitable for division into a large plurality of postcard pieces, the label stock having
   a paper layer,
   a single adhesive layer affixed to a first side of the paper layer, said single adhesive layer becoming the sole adhesive layer of each postcard piece,
   a plurality of sets of postcard indicia printed on a second side of the paper layer, each set of indicia being no longer than the length of a single postcard piece, and
   a peel-off backing sheet temporarily affixed to and covering the single adhesive layer;
a second spindle for mounting in second roll form a second long strip of developed photo stock suitable for division into the large plurality of postcard pieces;
a plurality of photos developed on the photo stock, each photo being substantially the length of a single postcard piece;
a backing peeler for removing the backing sheet;
a laminating press for pressing the photo stock against the single adhesive layer;
a cutter for separating the pressed-together strips of photo and label stocks into the plurality of postcard pieces; and
a manual calibration register for aligning each set of indicia with a photo.

15. The apparatus of claim 14 wherein:

the size of the postcard pieces are determined by postal mailing regulations.

16. The apparatus of claim 14 further including:

means for advancing the first and second strips toward the cutter.

17. The apparatus of claim 16 wherein:

the advancing means is comprised of
   a plurality of free rollers, and
   a plurality of dual-power rollers.

18. The apparatus of claim 16 further including:

a roll feed frame upon which the first and second spindles are mounted.

19. The apparatus of claim 18 further including:

a plurality of feed track segments for guiding the first and second strips as they advance.

20. Photo postcard apparatus for producing photo postcard pieces including:

a long strip of label stock capable of division into a large plurality of postcard pieces of equal length, the label stock having
   a paper layer,
   a single adhesive layer affixed to one side of the paper layer, said single adhesive layer becoming the sole adhesive layer of each postcard piece,
   a plurality of sets of postcard indicia printed on the other side of the paper layer,
   each set of indicia being substantially the length of a single postcard piece, and
   a peel-off backing sheet temporarily affixed to and covering the single adhesive layer;
a long strip of developed photo stock capable of division into the large plurality of postcard pieces of equal length;
a plurality of photos developed on the photo stock, each photo being the length of a single postcard piece;
a backing peeler for removing the backing sheet;
a laminating press for pressing the photo stock against the single adhesive layer;
a cutter for separating the pressed together photo and label stocks into the plurality of postcard pieces of equal length, the cutter having a cutter bed;
a manual calibration register for aligning each set of indicia with a photo and for aligning the photos with the cutter;
a plurality of free rollers for guiding the strips; and
a plurality of dual-power rollers for advancing the strips toward the cutter.

\* \* \* \* \*